United States Patent
Okami

(10) Patent No.: US 11,445,358 B2
(45) Date of Patent: Sep. 13, 2022

(54) TERMINAL APPARATUS, COMMUNICATION METHOD, AND STORAGE MEDIUM

(71) Applicant: CASIO COMPUTER CO., LTD., Tokyo (JP)

(72) Inventor: Yasuo Okami, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/118,119

(22) Filed: Dec. 10, 2020

(65) Prior Publication Data

US 2021/0185510 A1    Jun. 17, 2021

(30) Foreign Application Priority Data

Dec. 13, 2019 (JP) .............................. JP2019-225091
Apr. 13, 2020 (JP) .............................. JP2020-071712

(51) Int. Cl.
*H04W 8/18* (2009.01)

(52) U.S. Cl.
CPC .................................... *H04W 8/18* (2013.01)

(58) Field of Classification Search
CPC ....................................................... H04W 8/18
USPC ......................................................... 455/418
See application file for complete search history.

(56) References Cited

U.S. PATENT DOCUMENTS

| 10,716,019 B1* | 7/2020 | Velusamy | H04W 24/06 |
| 2014/0179373 A1 | 6/2014 | Hur et al. | |
| 2019/0068789 A1* | 2/2019 | Hotham | H04M 7/0057 |

FOREIGN PATENT DOCUMENTS

| JP | 2000293364 A | 10/2000 |
| JP | 2011086071 A | 4/2011 |
| JP | 2014-150407 A | 8/2014 |
| JP | 2015-167266 A | 9/2015 |
| WO | 2004/102930 A1 | 11/2004 |
| WO | 2014/030199 A1 | 2/2014 |

OTHER PUBLICATIONS

JPO; Application No. 2020-071712; Office Action dated Nov. 11, 2021.

* cited by examiner

*Primary Examiner* — Ahmad F. Matar
*Assistant Examiner* — Jirapon Intavong
(74) *Attorney, Agent, or Firm* — Fitch, Even, Tabin & Flannery LLP

(57) ABSTRACT

A terminal apparatus includes the following. A mounting unit can be mounted with two memory media each storing setting information regarding a communication path of data communication. A communicator performs data communication through a communication path according to the setting information of one of the two memory media. A processor is configured to perform the following processes. A first selecting process selects a first memory medium in which first setting information is stored when the following conditions are satisfied, wherein the conditions are that an application program being executed is a specific application program registered in advance and that a connection destination of data communication started by the application program being executed is a specific connection destination registered in advance. A second selecting process selects a second memory medium in which second setting information is stored when the above conditions are not satisfied.

15 Claims, 10 Drawing Sheets

TERMINAL APPARATUS, COMMUNICATION METHOD, AND STORAGE MEDIUM

CROSS-REFERENCE TO RELATED APPLICATION

This application is based upon and claims the benefit of priority from the prior Japanese Patent Application No. 2019-225091, filed on Dec. 13, 2019, and Japanese Patent Application No. 2020-071712, filed on Apr. 13, 2020, the entire contents of which are incorporated herein by reference.

BACKGROUND

Technical Field

The present invention relates to a terminal apparatus, a communication method and a storage medium.

Background Art

Conventionally, there is a technique used in a terminal apparatus which performs data communication to attach a SIM (Subscriber Identity Module) card (information storage medium) which records setting information according to contents of a communication contract by a user, and to perform data communication with a communication path according to the setting information of the SIM card. According to such technique, by attaching a SIM card which records setting information allowing data communication using a predetermined closed network, for example, it is possible to perform data communication which is high in safety using the closed network. Although described in detail later, a SIM card and an eSIM card may be simply referred to as a SIM.

Lately, there is a technique to attach two SIM cards to a terminal apparatus and to switch the SIM card according to the situation, that is, to switch the communication path of the data communication (dual SIM technique). For example, in the terminal apparatus for business purposes, by attaching a first SIM card which enables connection with a closed network for business and a second SIM card which enables communication with a typical network such as the internet which does not include the closed network, the first SIM card is used for business purposes to perform highly safe data communication, and the second SIM card is used for typical use in order to enable the use of various services. With this, use for different purposes becomes possible.

According to such terminal apparatus, the user needs to switch the SIM card depending on the purpose of use of the terminal apparatus. The SIM card is switched according to input operation by the user on a predetermined setting screen in the terminal apparatus, for example. JP 2014-150407 discloses a technique in which a mechanism is provided to switch the SIM card to be used depending on the posture or direction of the terminal apparatus so that the user is able to easily switch the SIM card.

However, it is not easy for the user to suitably switch the SIM card (that is, the setting of the communication path for data communication) each time, and the SIM card which is not suitable for the purpose of use of the terminal apparatus at this point may be selected. For example, if an application program for business is executed and the second SIM card is selected, the application program is not able to connect to the closed network and a communication error may occur. If the first SIM card is selected in a state with the general application program executed, the general application program may access to the closed network for business, and this becomes a risk to the network security.

As described above, according to the conventional technique, there is a problem that it is not easy to switch to the suitable setting of the communication patch according to the purpose of use of the terminal apparatus.

SUMMARY

To achieve at least one of the abovementioned objects, according to one aspect of the present invention, a terminal apparatus includes: a mounting unit to which two memory media each storing setting information regarding a communication path of data communication can be mounted; a communicator which performs data communication through a communication path according to the setting information of one of the two memory media; and a processor, wherein the processor is configured to perform the following processes, a first selecting process which selects from the two memory media a first memory medium in which first setting information is stored when the following conditions are satisfied, wherein the conditions are that an application program being executed is a specific application program registered in advance and that a connection destination of data communication started by the application program being executed is a specific connection destination registered in advance, and a second selecting process which selects from the two memory media a second memory medium in which second setting information is stored when the above conditions are not satisfied.

DETAILED DESCRIPTION OF THE PREFERRED EMBODIMENTS

The embodiments regarding the terminal apparatus, the communication method, and the storage medium according to the present invention are described below with reference to the drawings.

Figure 1:
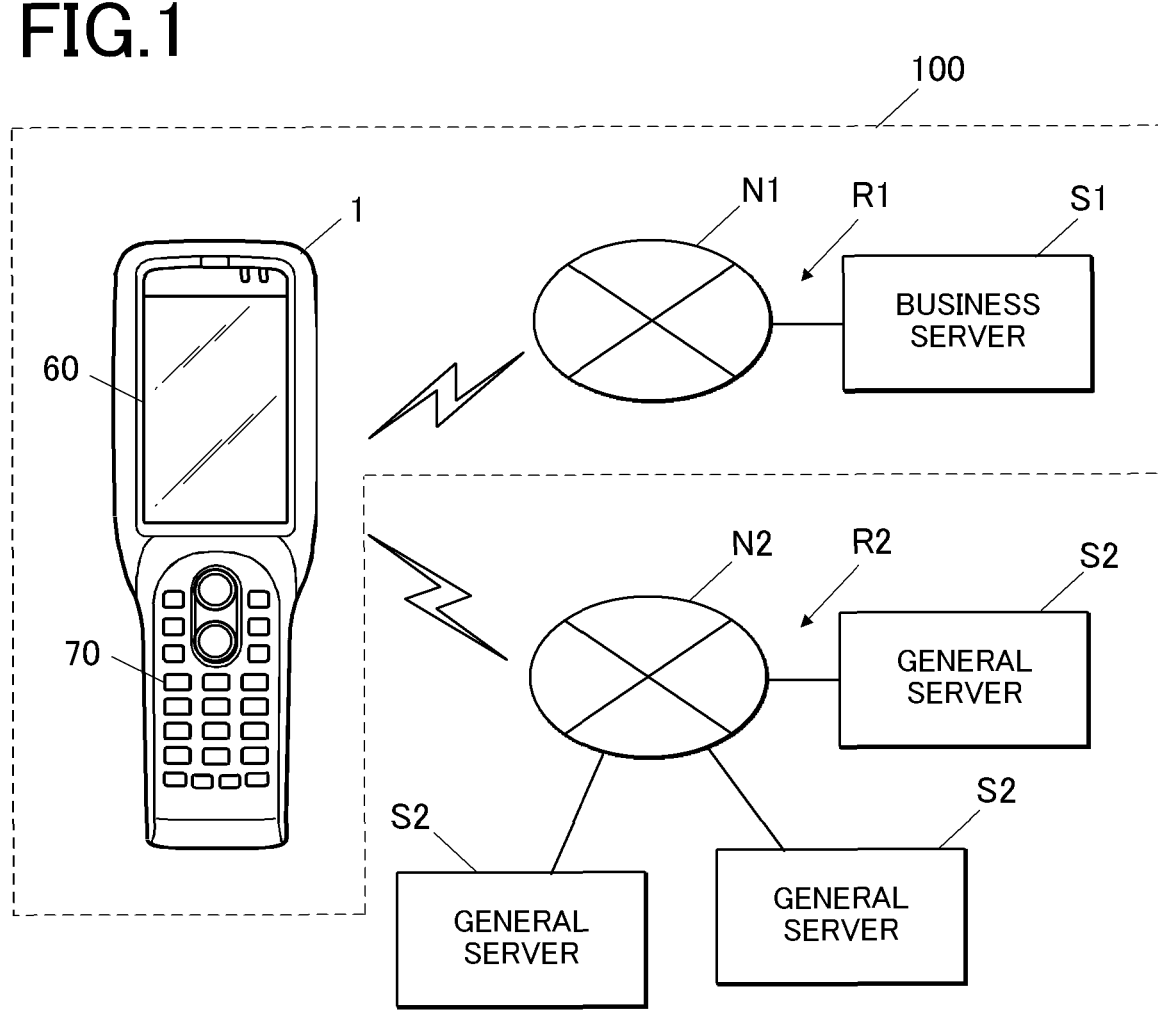
FIG. 1 is a schematic diagram showing a terminal apparatus and a business system.

FIG. 1 is a schematic diagram showing a terminal apparatus and a business system 100.

The business system 100 includes a terminal apparatus 1, and a business server S1 connected to a terminal apparatus 1 through a closed network N1.

The terminal apparatus 1 is a hand-held terminal used for product management in a store, warehouse, etc. In response to the operation by the operator (below, described as "terminal user"), the terminal apparatus 1 reads the barcode attached to a product. The terminal apparatus 1 transmits data regarding the read result to the business server S1 through a communication path using the closed network N1 (hereinafter referred to as "closed communication path R1"). Specifically, an intranet (private network such as an in-house network or business network) to which the business server S1 is connected is omitted in FIG. 1, and the terminal apparatus 1 and the business server S1 perform data communication through the closed network N1 and the intranet.

The business server S1 accumulates and manages the data received from the terminal apparatus 1.

The closed network N1 is a communication network which is not directly connected to a general network N2 and which is closed and connects limited points. Here, the general network N2 does not include the closed network N1, and is an open communication network in which the user is not limited, such as the internet.

The closed network N1 may be separated logically from the general network N2 at the gateway. The closed network N1 can include a VPN (Virtual Private Network). That is, FIG. 1 illustrates the closed network N1 and the general network N2 separately, but the closed network N1 can be a network logically separating a portion of the general network N2. The communication path to the business server S1 (specifically, the intranet to which the business server S1 is connected) for the closed network N1 can be physically separated from the general network N2. By using the closed network N1, risks to the network security due to interference from the general network N2 become small and safe data communication can be performed.

By switching the communication setting, the terminal apparatus 1 is able to perform data communication with the communication path (hereinafter referred to as "general communication path R2") using the general network N2. Therefore, the terminal apparatus 1 performs data communication with communication devices such as a general server S2 through the general communication path R2, and with this, the terminal apparatus 1 is able to use various services.

The method to switch the communication path between the closed communication path R1 and the general communication path R2 as the communication path used by the terminal apparatus 1 is described later.

The business system 100 is not limited to the system which performs management of products as described above, and can be any system which performs data communication through the closed communication path R1 between the terminal apparatus 1 and the communication apparatus such as the business server S1. Such systems include, a system which manages a result of measuring gas for each home or a system which manages information regarding personnel in a company.

The terminal apparatus 1 is not limited to a handy terminal, and can be any information terminal held and used by a user of a terminal, examples including a smartphone, a tablet terminal, or a laptop PC.

Figure 2:
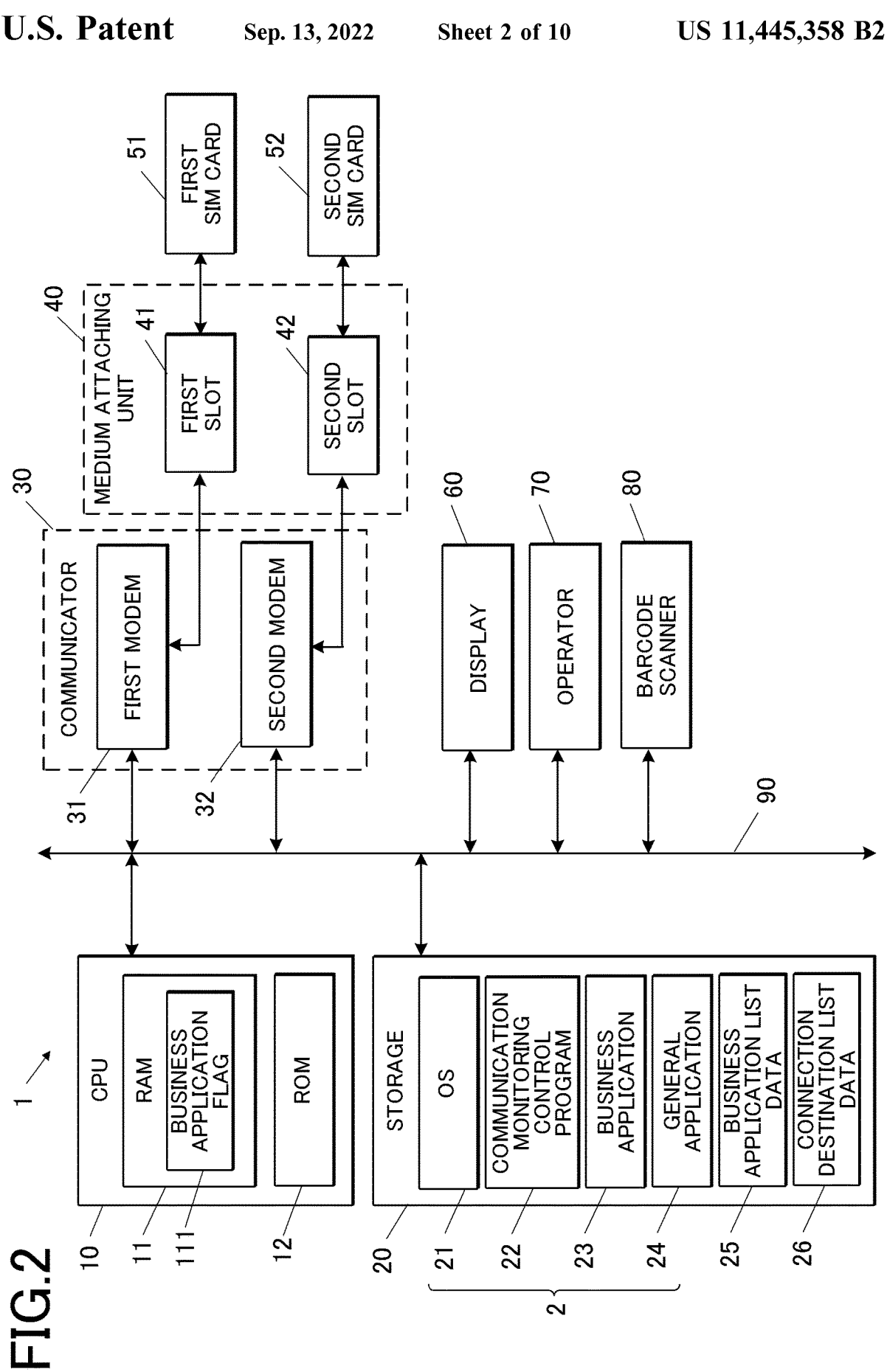
FIG. 2 is a block diagram showing a configuration of main functions in the terminal apparatus.

FIG. 2 is a block diagram showing a configuration of the main functions in the terminal apparatus 1.

The terminal apparatus 1 includes a CPU 10 (Central Processing Unit) including a RAM 11 (Random Access Memory) and ROM 12 (Read Only Memory), a storage 20 (non-transitory computer-readable storage medium), a communicator 30, a medium attaching unit 40 (first mounting unit), a display 60, an operator 70, a barcode scanner 80, and a bus 90. The units of the terminal apparatus 1 are connected through the bus 90.

The CPU 10 is a processor which performs the processes according to a program 2 stored in the storage 20 and which controls each unit of the terminal apparatus 1. Here, the program 2 includes an OS 21 (operating system), a communication monitoring control program 22, a business application 23 (application program) and a general application 24 (application program). The CPU 10 executes various processes including a selecting process (first selecting process, second selecting process), a communication control unit, and a registering process according to the program 2.

Among the above, the CPU 10 in the communication control process executes the application program specified from the business application 23 or the general application 24, and the CPU 10 uses the communicator 30 to perform data communication according to the application program.

The RAM 11 provides a memory space for work in the CPU and stores temporary data. The RAM 11 may include a nonvolatile memory. A business application flag 111 may be stored in the RAM 11. The business application flag 111 is 1 bit data which shows whether a later-described foreground application is a business application 23.

The ROM 12 is a nonvolatile storage from which information can be read and stores various setting data, etc.

The storage 20 includes a storage device such as a HDD (Hard Disk Drive), or a SSD (Solid State Drive) in which data can be written and read. The storage stores the program 2 including an OS 21, the communication monitoring control program 22, the business application 23, and the general application 24, and various setting data. Among the above, two or more business applications 23 can be stored. Moreover, two or more general applications 24 can be stored.

Examples of the setting data stored in the storage 20 include, business application list data 25 (first list data) and connection destination list data 26 (second list data).

The above programs and setting data will be described in detail later.

The communicator 30 includes a first modem 31 and a second modem 32.

Each of the first modem 31 and the second modem 32 are communication modules including an antenna, a modulation/demodulation circuit, a signal processing circuit, and the like. The first modem 31 and the second modem 32 perform data communication corresponding with communication standards regarding wireless communication.

The communicator 30 performs wireless communication using one of the first modem 31 or the second modem 32 selected according to a selecting process (first selecting process, second selecting process) by the CPU 10.

The medium attaching unit 40 (first mounting unit) includes a first slot 41 connected to the first modem 31 and a second slot 42 connected to the second modem 32.

Each of the first slot 41 and the second slot 42 is a card slot in which the SIM card is inserted, and includes a terminal which electrically connects with an electrode of the SIM card.

A first SIM card 51 (first memory medium) is attached to the first slot 41. The first modem 31 is able to read the setting information recorded in the first SIM card 51 through the first slot 41.

A second SIM card 52 (second memory medium) is attached to the second slot 42. The second modem 32 is able to read the setting information recorded in the second SIM card 52 through the second slot 42.

Each of the first SIM card 51 and the second SIM card 52 is an IC card in which the setting information regarding the communication path of the data communication using the communicator 30 is stored. The setting information includes an identification number to specify a subscriber of a communication contract. The identification number is, for example, IMSI (International Mobile Subscriber Identity), and includes a subscriber identification number to be able to specify a subscriber and an identification number to specify a country or a carrier. From such IMSI, the network which can be used according to the communication contract subscribed by the subscriber can be specified, and the communication path which the communicator 30 can use for data communication can be specified.

According to the present embodiment, setting information to allow the communicator 30 to perform data communication through the closed communication path R1 using the closed network N1 is recorded in the first SIM card 51.

Setting information to allow the communicator 30 to perform data communication through the general communication path R2 using the general network N2 is recorded in the second SIM card 52.

Therefore, when the first modem 31 is selected under the control of the CPU 10, the communicator 30 is able to perform data communication through the closed communication path R1 by the first modem 31 based on the setting information in the first SIM card 51. When the first modem 31 is selected, the communicator 30 cannot perform data communication through the general communication path R2.

When the second modem 32 is selected under the control of the CPU 10, the communicator 30 is able to perform data communication through the general communication path R2 by the second modem 32 based on the setting information in the second SIM card 52. When the second modem 32 is selected, the communicator 30 cannot perform data communication through the closed communication path R1.

Therefore, the process in which the CPU 10 selects either one of the first modem 31 or the second modem 32 corresponds to selecting either one of the first SIM card 51 or the second SIM card 52. Therefore, hereinbelow, selecting the first modem 31 may be described as "selecting the first SIM card 51" and selecting the second modem 32 may be described as "selecting the second SIM card 52".

The display 60 includes a liquid crystal display and an organic Electro Luminescence (EL) display and displays the result and the state of the various processes.

The operator 70 includes a trigger key to scan a barcode, a cursor key, an input key to input numbers and characters, a function key, and the like. The operator 70 converts an input operation on these keys by the terminal user to an operation signal and outputs the signal to the CPU 10. The operator 70 may receive the input operation from the terminal user by a touch panel positioned overlapped on the screen of the display 60.

The barcode scanner 80 reads a barcode generated according to a predetermined principle and decodes the obtained signal. The barcode scanner 80 outputs the signal to the CPU 10. At least a portion of the process of decoding the signal can be performed by the CPU 10.

Figure 3:
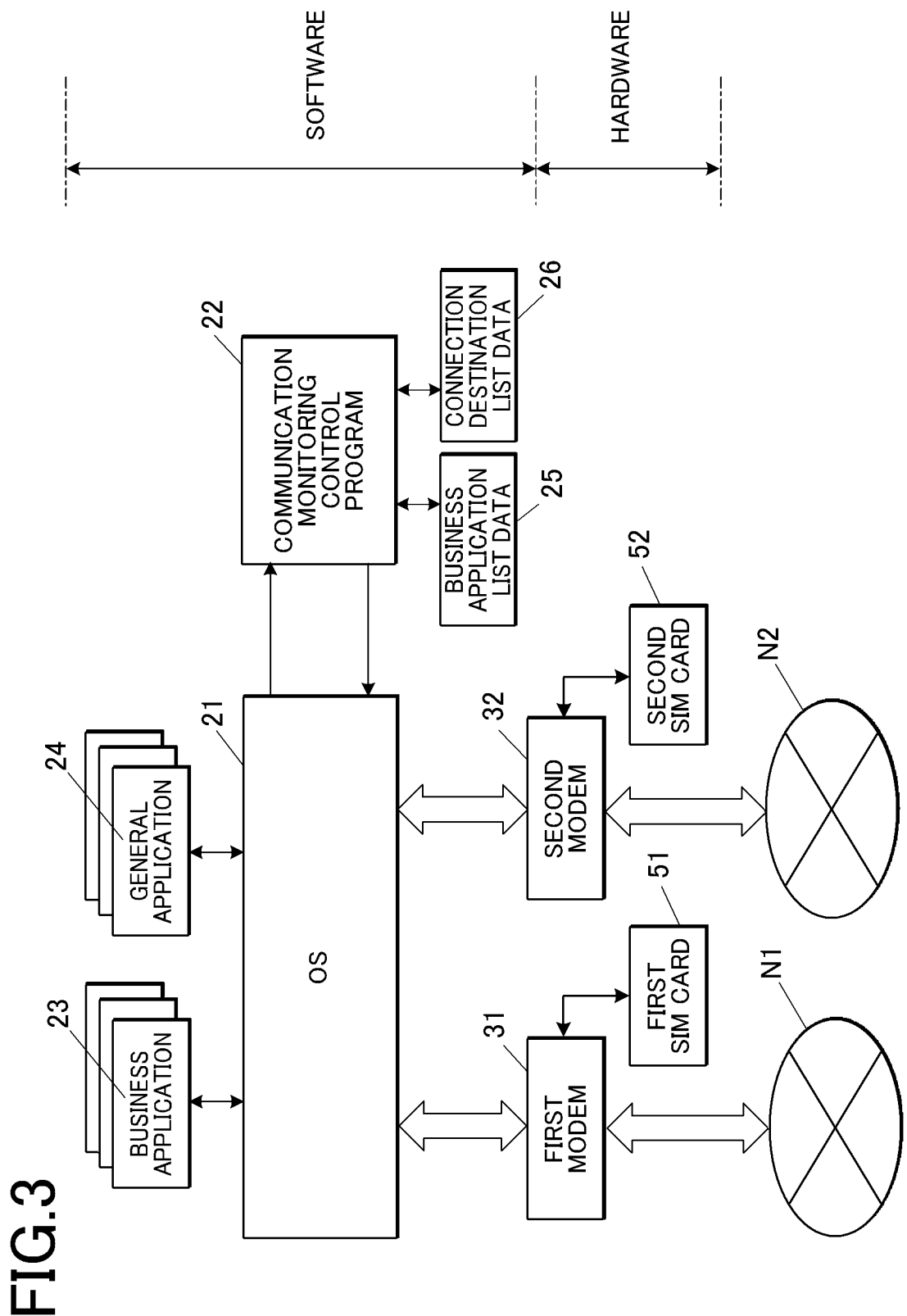
FIG. 3 is a block diagram showing a configuration of software in the terminal apparatus.

FIG. 3 is a block diagram showing a configuration of software in the terminal apparatus 1.

The subject performing the various processes according to the programs described below is the CPU 10. However, for the ease of description, in the description below, it may be described that the program is executing the various processes.

The OS 21 is the basic software to operate the terminal apparatus 1.

The OS 21 is used to control and manage the operation of the hardware such as the first modem 31 and the second modem 32 by a device driver which is not shown. With the OS 21, the management of the storage region in the RAM 11 and the management of the process executed by the CPU 10 are also performed.

The OS 21 provides a basic interface for the business application 23 and the general application 24. That is, the business application 23 and the general application 24 operate on the OS 21.

The business application 23 is an application program dedicated to business in order to perform information processes regarding business by the user on the terminal apparatus 1. For example, the business application 23 is used for processes such as reading a barcode of a product with the barcode scanner 80 and transmitting the information of the read barcode to the business server S1. For example, if the business system 100 is for managing results of measuring gas meters, and the terminal apparatus 1 is a hand-held terminal used for collecting the results of measuring gas meters, the business application 23 is used for performing the process of recording the measured result and the process of transmitting the measured result to the business server S1.

As described here, the purpose of use of the business application 23 is limited to business in the business system 100, and therefore, the destination of communication of the data communication performed while the business application 23 is being executed is limited to the business server S1 shown in FIG. 1. When the data communication is started while the business application 23 is being executed, the first modem 31 (therefore, the first SIM card 51) is selected and the wireless communication through the closed communication path R1 is possible.

Before the terminal user starts using the terminal apparatus 1, the business application 23 is installed in the terminal apparatus 1 in advance by an administrator (hereinafter referred to as "administrator user") of the business system 100 and is stored in the storage 20. Therefore, the business application 23 can be said to be an application program which is authorized in advance to perform data communication by wireless communication using the closed communication path R1.

The general application 24 is an application program other than the business application 23. For example, the general application 24 is downloaded from a general server S2 through the general communication path R2 and installed, and is stored in the storage 20.

There are various general applications 24 with different purposes and functions, and a malicious application program (malware) created for the purpose of operating the terminal apparatus 1 irregularly may be included. If such malware accesses to the business server S1 through the closed communication path R1, this becomes a risk to the network security of the business system 100.

Therefore, according to the terminal apparatus 1, in order to prevent access by the general application 24 to the business server S1 through the closed communication path R1, when the data communication starts while the general application 24 is being executed, the second modem 32 (therefore, the second SIM card 52) is selected and the wireless communication using the general communication path R2 is performed.

The communication monitoring control program 22 monitors for a request to start data communication (TCP connection start request) by the application program which is being executed (business application 23 or general application 24). When the data communication starts, either one of the first SIM card 51 or the second SIM card 52 is selected so that the data communication is performed using the suitable communication path according to the application program. In detail, the selected result is notified to the OS 21 and the CPU 10 selects one of the SIM cards shown by the selection result. The communication monitoring control program 22 is middleware which is not acknowledged by the terminal user. Regardless of whether the business application 23 or the general application 24 is being executed, the communication monitoring control program 22 is always operating and monitors the request to start the data communication.

The application program being executed by the CPU 10 is notified from the OS 21 to the communication monitoring program 22. With this, the communication monitoring control program 22 specifies the foreground application in each point. Here, the foreground application is the application program being executed by the CPU 10 among the business application 23 and the general application 24, that is, the application program which is operating. Normally, the foreground application is displayed on the front of the display 60. The foreground application is in an active state which can be operated by the terminal user, and the data communication can be started in response to the operation. Usually, operation is not performed for the application programs other than the foreground applications. When the foreground application is switched, the background process of the application program other than the foreground application can be turned off.

When the foreground application is switched, the switch of the foreground application is notified from the OS 21 to the communication monitoring control program 22. Therefore, the communication monitoring control program 22 is able to specify the foreground application at any point.

When the data communication starts, the connection destination of the data communication is notified from the OS 21 to the communication monitoring control program 22.

When the data communication starts according to the foreground application, the communication monitoring control program 22 selects the suitable one from the first SIM card or the second SIM card 52 based on the foreground application and the connection destination of the data communication.

In detail, when the foreground application is a specific application program determined in advance from the business application 23 or the general application 24, and the connection destination of the data communication started according to the foreground application is one or a plurality of specific connection destinations connected by the closed communication path R1, the communication monitoring control program 22 selects the first SIM card 51. When the first SIM card 51 is not selected, the communication monitoring control program 22 selects the second SIM card 52.

Here, the communication monitoring control program 22 determines whether the foreground application is the specific application program based on business application list data 25.

The specific application program is listed in the business application list data 25 and registered. The specific application program is an application program in which data communication with the server S1 through the closed communication path R1 is allowed in advance by the administrator user. The specific application program according to the present embodiment is limited to the business application 23 installed by the administrator user in advance and does not include the general application 24. That is, in the business application list data 25, the business application 23 as the specific application program is listed. The specific application program may be one program or may be two or more programs.

The communication monitoring control program 22 determines whether the destination of connection of the data communication which starts according to the foreground application is the specific destination of connection based on connection destination list data 26.

Connection destinations which are allowed in advance by the administrator user to be accessed by the business application 23 are listed in the connection destination list data 26. The format of the specific connection destination shown by the connection destination list data 26 is not limited, and possible examples include URL or IP address.

As described above, in the terminal apparatus 1 according to embodiment 1, the selection (switching) of the SIM card is performed by the CPU 10 performing the selecting process (first selecting process, second selecting process) according to the communication monitoring control program 22. The terminal user cannot perform the switching of the SIM card. That is, the terminal apparatus 1 does not include a unit to receive input operation from the terminal user to switch the SIM card. With this, it is possible to prevent trouble due to error in operation by the terminal user such as the general application 24 accessing to the closed network N1 or access to the closed network N1 by the business application 23 being cut.

Next, the application monitoring process and the communication monitoring process performed by the communication monitoring control program 22 is described. The application monitoring process and the communication monitoring process are performed while the terminal apparatus 1 is in operation.

Figure 4:
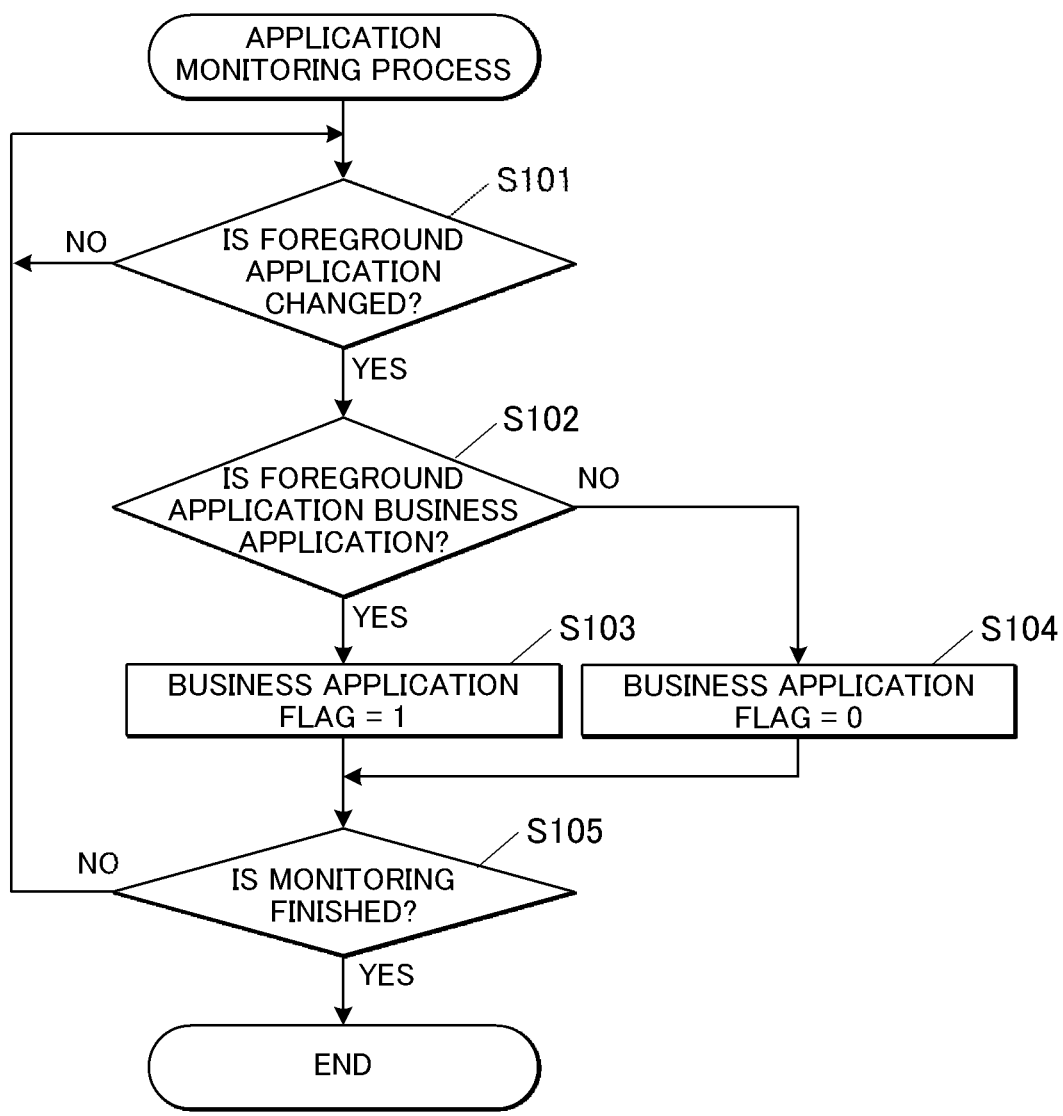
FIG. 4 is a diagram showing a control procedure in an application monitoring process.

FIG. 4 is a diagram showing a control procedure by the CPU 10 in the application monitoring process.

When the application monitoring process starts, the CPU 10 determines whether the foreground application is changed (step S101). If it is determined that the foreground application is not changed ("NO" in step S101), the CPU 10 performs the process in step S101 again.

When it is determined that the foreground application is changed ("YES" in step S101), the CPU 10 determines whether the changed foreground application is the business application 23, that is, whether the changed foreground application is any one of the business applications 23 listed in the business application list data 25 (step S102).

In the process in step S101, when any application program is executed from a state in which the application program is not executed, such as when the first application program is executed after the terminal apparatus 1 is started, similar to when the foreground application is changed, the CPU 10 determines "YES" in step S101 and performs the process in step S102.

When it is determined that the changed foreground application is the business application 23 ("YES" in step S102), the CPU 10 updates the business application flag 111 to "1" (step S103). Further, when it is determined that the changed foreground application is not the business application 23, that is, it is determined to be the general application 24 ("NO" in step S102), the CPU 10 updates the business application flag 111 to "0" (step S104).

When the process in step S103 or step S104 ends, the CPU 10 determines whether there is an instruction to end the monitoring of the switching of the foreground application (step S105). Here, when there is an instruction to turn off the power of the terminal apparatus 1 or there is an instruction to advance the terminal apparatus 1 to sleep mode, the CPU 10 determines that there is an instruction to end the monitoring of switching. When it is determined that there is no instruction to end the monitoring of the switching ("NO" in step S105), the CPU 10 returns the process to step S101.

When it is determined that there is an instruction to end the monitoring of switching ("YES" in step S105), the CPU 10 ends the application monitoring process.

Figure 5:
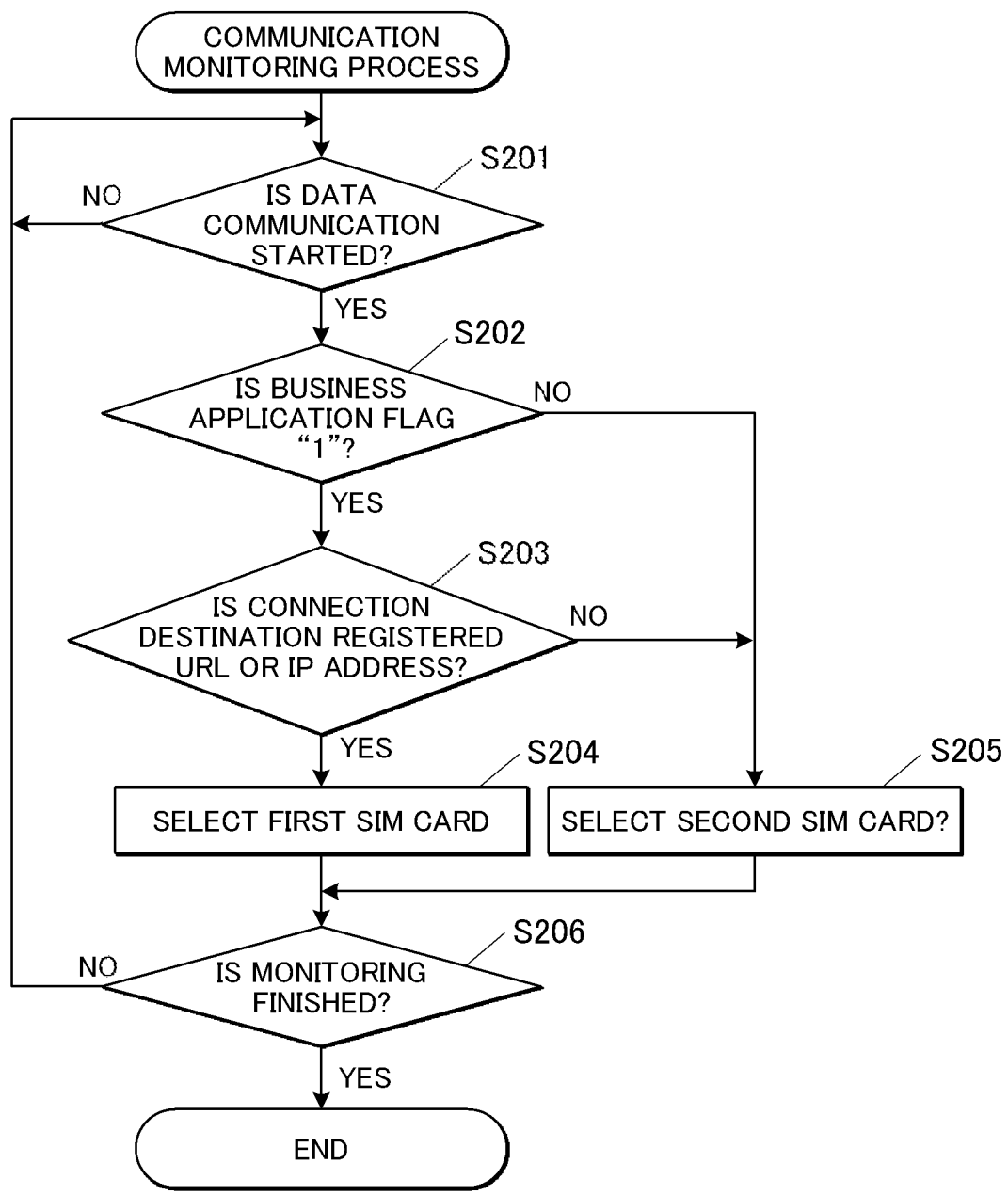
FIG. 5 is a diagram showing a control procedure of a communication monitoring process.

FIG. 5 is a diagram showing a control procedure by the CPU 10 in the communication monitoring process.

When the communication monitoring process starts, the CPU 10 determines whether the data communication by the foreground application starts (step S201). If it is determined that the data communication does not start ("NO" in step S201), the CPU 10 performs the process in step S201 again.

When it is determined that the data communication starts ("YES" in step S201), the CPU 10 determines whether the business application flag 111 is "1" (step S202). When it is determined that the business application flag 111 is "1" ("YES" in step S202), the CPU 10 determines whether the connection destination of the data communication which starts is the registered URL or the registered IP address, that is, the URL or the IP address listed in the connection destination list data 26.

When it is determined that the connection destination of the data communication is the registered URL or the registered IP address ("YES" in step S203), the CPU 10 selects the first SIM card 51 (step S204, first selecting process, first selecting step), and data communication is performed with the closed communication path R1 by the first modem 31.

When it is determined that the business flag application in the process in step S202 is "0" ("NO" in step S202), or when it is determined that the connection destination of the data communication in the process in step S203 is not the registered URL or the registered IP address ("NO" in step S203), the CPU 10 selects the second SIM card 52 (step S205, second selecting process, second selecting step), and the data communication is performed with the general communication path R2 by the second modem 32.

When the process in step S204 or step S205 ends, the CPU 10 determines whether there is the instruction to end the communication monitoring (step S206). When there is an instruction to turn off the power of the terminal apparatus or an instruction to advance the mode of the terminal apparatus 1 to sleep mode, the CPU 10 determines there is an instruction to end the communication monitoring. When it is determined that there is no instruction to end the communication monitoring ("NO" in step S206), the CPU 10 returns the process to step S201.

When it is determined that there is an instruction to end the communication monitoring ("YES" in step S206), the CPU 10 ends the communication monitoring process.

According to the control procedure of the application monitoring process and the communication monitoring process, it is possible to understand that, when the application program being executed is the business application 23 as the specific application program determined in advance ("YES" in step S102 in FIG. 4) and the connection destination of the data communication which starts according to the application program being executed is one or two or more specific connection destinations connected through the closed communication path R1 ("YES" in step S203), the CPU 10 in the selecting process selects the first SIM card 51 (step S204, first selecting process, first selecting step) and when the first SIM card 51 is not selected, the second SIM card 52 is selected (step S205, second selecting process, second selecting step).

(Modification 1)

Next, modification 1 according to the present embodiment is described. The present modification is different from the above embodiment in that the setting of the specific application program can be added. The difference from the above embodiment is described below.

According to the above embodiment, the specific application programs are listed in the business application list data 25 in advance and fixed. According to the present modification, the CPU 10 executes the registering process to register the application programs obtained by a specific method and stored in the storage 200 as the specific application program later in the business application list data 25.

One of the above specific methods is a method to obtain the application program with the closed communication path R1 when the first SIM card 51 is selected. That is, according to the modification, when the application program is downloaded (obtained) and installed when the first SIM card 51 is selected and the application program is stored in the storage 20, the CPU 10 in the registering process adds the application program as the specific application program in the business application list data 25. This is because when the first SIM card 51 is selected, the path to obtain the application program is limited to the closed communication path R1 and the source of supplying the application program is limited to the device related to the business such as the business server S1. That is, the application program which can be obtained when the first SIM card 51 is selected is limited to the application program (according to the present embodiment, business application 23) which is safe and does not cause the problem to the network security even if the data communication is performed with the closed communication path R1.

Figure 6:
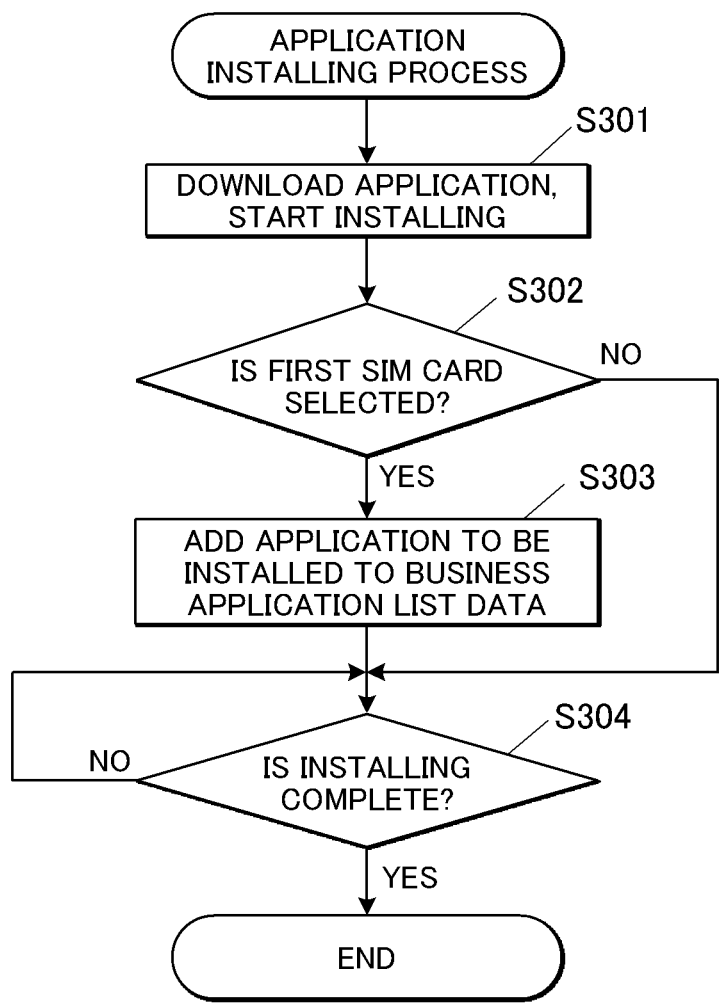
FIG. 6 is a flowchart showing an application installing process according to modification 1.

FIG. 6 is a flowchart showing a control procedure by the CPU 10 to perform the application installing process according to the modification 1.

The application installing process starts when there is an instruction to download or install the application program according to input operation by the terminal user.

When the application installing process starts, the CPU 10 starts the series of processes including a downloading process and an installing process of the specified application program (step S301).

The CPU 10 determines whether the first SIM card 51 is being selected (step S302), and when it is determined that the first SIM card 51 is being selected ("YES" in step S302), the application program to be installed is added to the business application list data 25 as the specific application program (step S303, registering process).

After the processing in step S303 ends, or when it is determined that the first SIM card 51 is not being selected in the process in step S302 (that is, the second SIM card 52 is being selected) ("NO" in step S302), the CPU 10 determines whether the installing process is completed (step S304). When the CPU 10 determines that the installing process is not complete ("NO" in step S304), the process in step S304 is performed again. When it is determined that the installing process is complete ("YES" in step S304), the application installing process ends.

Another method to specify is a method to be able to obtain the application program which is permitted by the administrator user of the terminal apparatus 1 to be obtained. When the application program is installed and stored in the storage 20 according to this method, the CPU 10 in the registering process adds the application program as the specific application program in the business application list data 25. This is because in this case the installed application program is limited to the application program which is permitted in advance to perform data communication with the closed communication path R1 (according to the present embodiment, the business application 23). Here, the method to be able to obtain the application program which is permitted by the administrator user to be obtained is not limited. For example, there is a method to install the application program in the terminal apparatus 1 from a specific memory card (specific storage medium).

(Modification 2)

Next, modification 2 of the above embodiment is described. The present modification is different from the above embodiment in that an eSIM is used in addition to (or instead of) the SIM card. The present modification can be combined with the above modification 1. Below, the difference from the embodiments is described.

Figure 7:
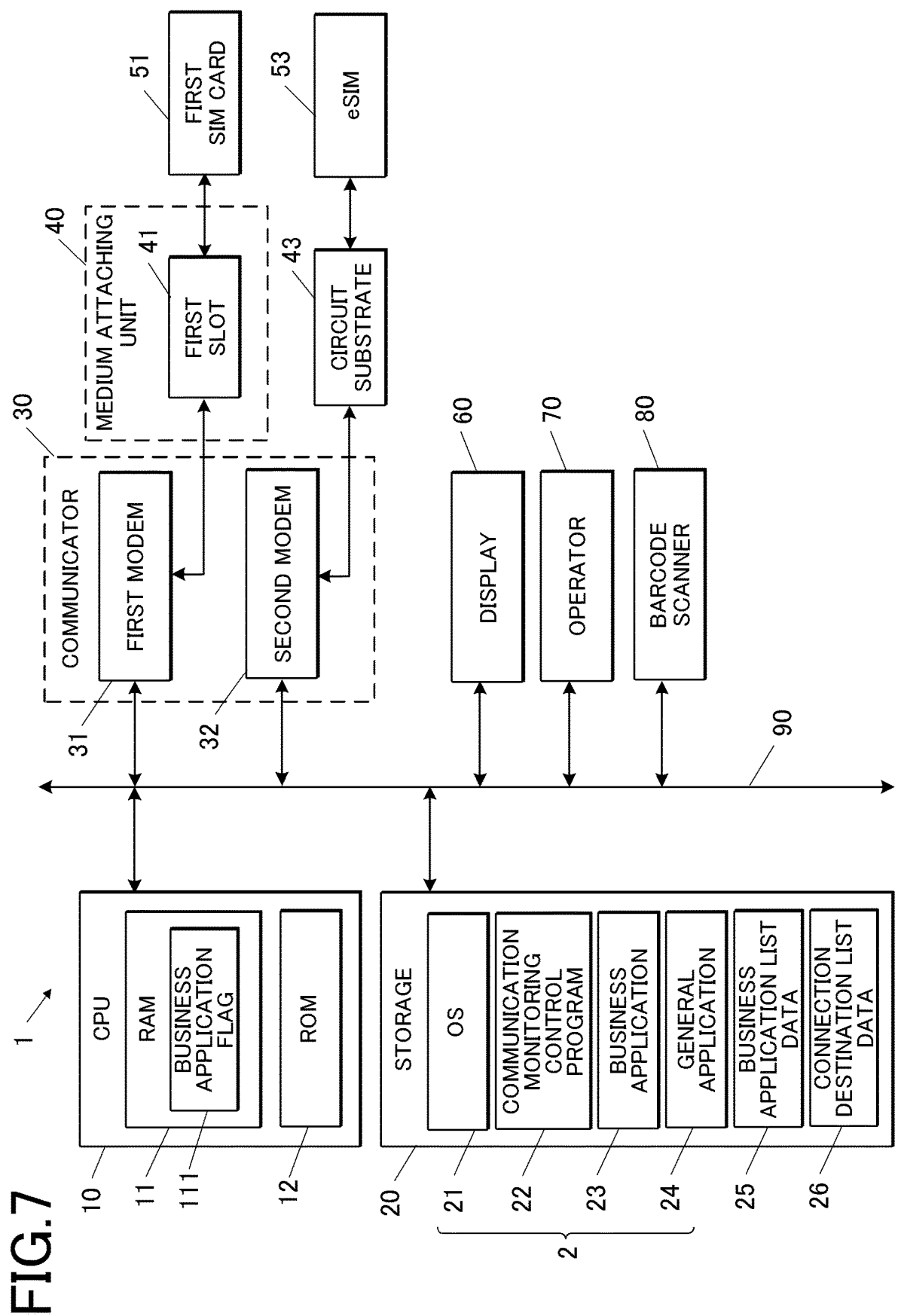
FIG. 7 is a block diagram showing a configuration of main functions in the terminal apparatus according to modification 2.

FIG. 7 is a block diagram showing a configuration of main functions of a terminal apparatus 1 according to modification 2.

Figure 8:
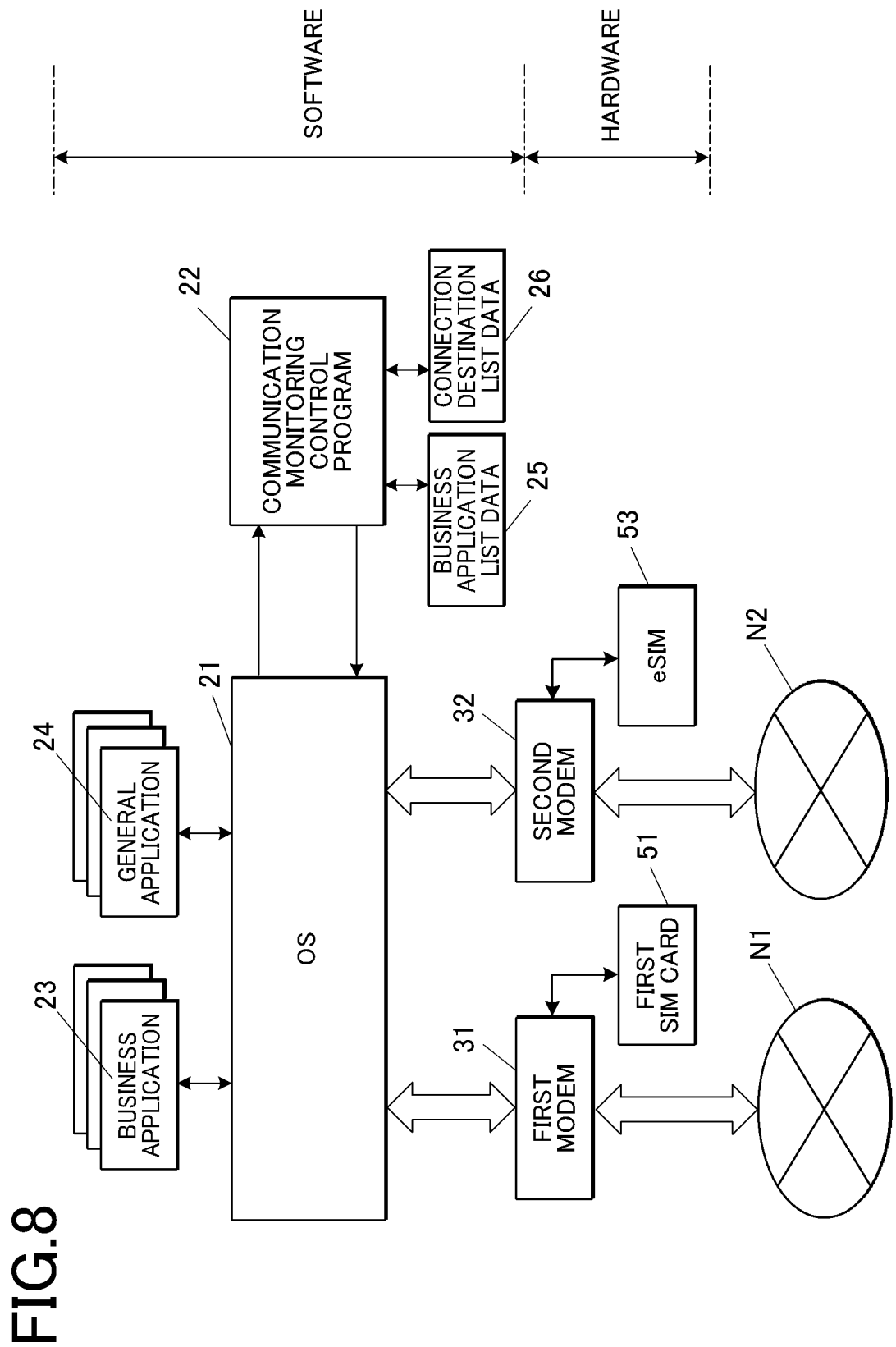
FIG. 8 is a block diagram showing a configuration of the terminal apparatus according to modification 2.

FIG. 8 is a block diagram showing a configuration of the terminal apparatus 1 according to modification 2.

The terminal apparatus 1 according to the present modification includes a circuit substrate 43 (second mounting unit) connected to a second modem 32 and an eSIM 53 as an information recording element mounted (attached) to the circuit substrate 43. The eSIM 53 is an electronic element (chip) mounted by soldering to the circuit substrate 43 in a state which is not detachable and is also called an "embedded SIM". Similar to the SIM card, the eSIM 53 records setting information regarding the communication path for the data communication. The circuit substrate 43 is connected to the bus 90 directly or through the second modem 32. The CPU 10 and the communicator 30 are able to access to the eSIM 53 and are able to read the setting information.

In the example shown in FIG. 7 and FIG. 8, similar to the above embodiment, the setting information (hereinafter described as "first setting information") for the communicator 30 to perform data communication using the closed communication path R1 using the closed network N is recorded in the first SIM card 51 (first memory medium).

The second SIM card 52 is not attached and the eSIM 53 is used instead of the second SIM card 52 (second memory medium). Similar to the second SIM card 52, the setting information (hereinafter described as "second setting information") for the communicator 30 to perform data communication with the general communication path R2 using the general network N2 is recorded in the eSIM 53.

According to the example shown in FIG. 7 and FIG. 8, when the first SIM card 51 is selected, based on the first setting information in the first SIM card 51, data communication is performed with the closed communication path R1 using the closed network N1 by the first modem 31. The data communication through the general communication path R2 using the general network N2 is not performed.

When the eSIM 53 is selected, based on the second setting information of the eSIM 53, the data communication is performed through the general communication path R2 using the general network N2 by the second modem 32. The data communication through the closed communication path R1 is not performed.

The process to select either one of the first SIM card 51 or the eSIM 53 is similar to the process to select either one of the first SIM card 51 or the second SIM card 52 according to the above-described embodiment. When the following conditions are satisfied, that is, the foreground application is the specific application program determined in advance from the business application 23 and the general application 24, and the connection destination of the data communication started according to the foreground application is any of one or two or more specific connection destinations connected through the closed communication path R1, the first SIM card 51 recording the first setting information is selected (first selecting process). When the above conditions are not satisfied (that is, the first SIM card 51 is not selected), the eSIM 53 in which the second setting information is recorded is selected (second selecting process).

The setting information recorded in the first SIM card 51 and the eSIM 53 are not limited to the above. For example, the first setting information for the communicator 30 to perform the data communication through the closed communication path R1 may be recorded in the eSIM 53, and the second setting information for the communicator 30 to perform the data communication through the general communication path R2 may be recorded in the first SIM card 51.

Figure 9:
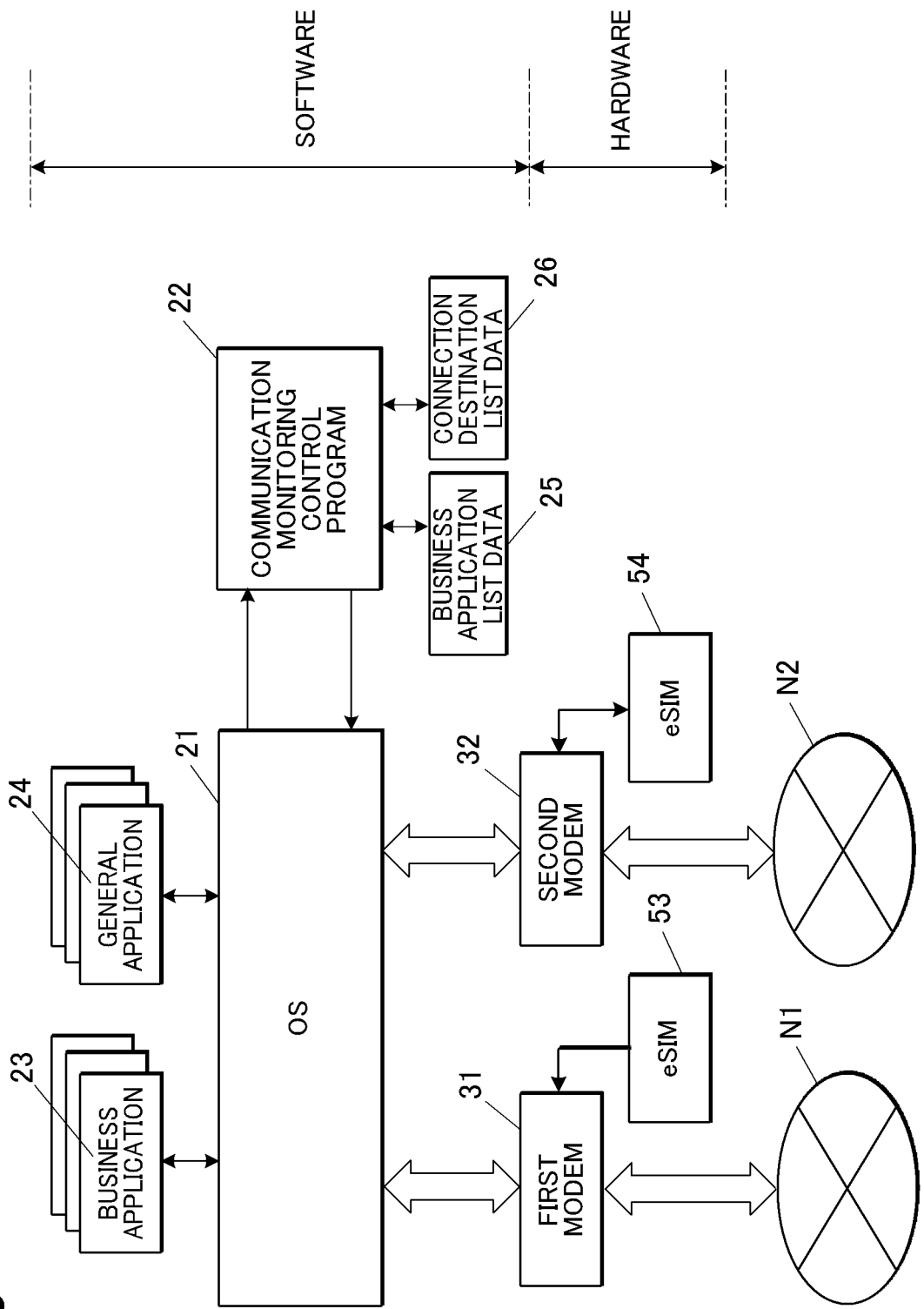
FIG. 9 is a block diagram showing other configurations of the terminal apparatus according to modification 2.

As shown in FIG. 9, two eSIMs 53 and 54 can be used, without using SIM cards. According to the example shown in FIG. 9, the first setting information is recorded in the eSIM 53, and the second setting information is recorded in the eSIM 54. When the above conditions are satisfied, the eSIM is selected, and when the above conditions are not satisfied, the eSIM 54 is selected.

(Modification 3)

Next, the modification 3 of the above embodiment is described. The present modification is different from the above embodiment in that three or more SIM cards and/or eSIMs are used. The present modification may be a combination with the above-described modification 1. The difference from the above-described embodiment is described below.

Figure 10:
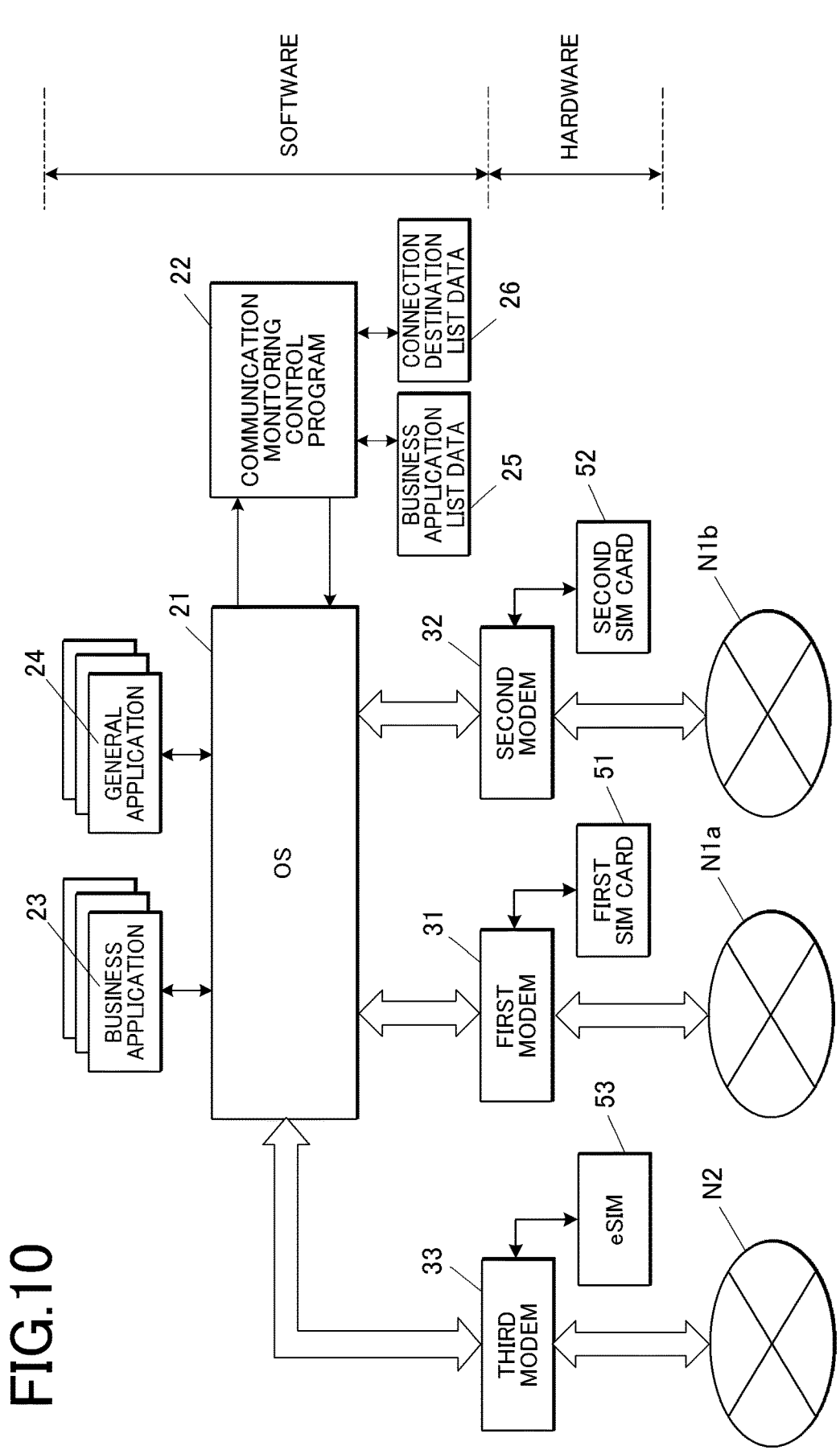
FIG. 10 is a block diagram showing a configuration of the terminal apparatus according to modification 3.

FIG. 10 is a block diagram showing a configuration of the terminal apparatus 1 according to the modification 3.

According to the modification 3, in addition to the first modem 31 and the second modem 32, the communicator 30 of the terminal apparatus 1 includes the third modem 33. The first SIM card 51 is connected to the first modem 31, the second SIM card 52 is connected to the second modem 32, and the eSIM 53 is connected to the third modem 33. In each of the first SIM card 51 and the second SIM card 52, different first setting information for the communicator 30 to perform the data communication through the different closed communication paths R1 is recorded. The second setting information for the communicator 30 to perform data communication through the general communication path R2 is recorded in the eSIM 53. Below, the closed communication path R1 in which data communication using the first setting information in the first SIM card 51 is possible is to be the closed communication path R1a using the closed network N1a, and the closed communication path R1 in which data communication using the first setting information in the second SIM card 52 is possible is to be the closed communication path R1b using the closed network N1b.

According to the present modification, when the following first conditions are satisfied, that is, when the foreground application is the specific application program determined in advance so as to perform communication through the closed communication path R1a and the connection destination of the data communication started according to the foreground application is any of one or two or more specific communication destinations connected by the closed communication path R1a, the first SIM card 51 is selected (first selecting process). When the first SIM card 51 is selected, the data communication is performed with the closed communication path R1a by the first modem 31, and the data communication through the closed communication path R1b and the general communication path R2 is not performed.

When the following second conditions are satisfied, that is, the foreground application is the specific application program determined in advance to perform communication through the closed communication path Rib, and the connection destination of the data communication started according to the foreground application is any of one or two or more specific connection destinations connected by the closed communication path Rib, the second SIM card 52 is selected. When the second SIM card 52 is selected, the data communication through the closed communication path R1b is performed by the second modem 32, and the data communication through the closed communication path R1a and the general communication path R2 is not performed.

When the first condition and the second condition are both not satisfied, the eSIM 53 is selected (second selecting process). When the eSIM 53 is selected, data communication through the general communication path R2 is performed by the third modem 33, and the data communication through the closed communication paths R1a and R1b is not performed.

FIG. 10 shows an example using two SIM cards and one eSIM but the configuration is not limited to the above. For example a combination including one SIM card and two eSIMs can be employed. Alternatively, three SIM cards can be used without using the eSIM. Alternatively, three eSIMs can be used without using the SIM card. Moreover, the total number of SIM cards and eSIMs can be four or more.

As described above, the terminal apparatus 1 according to the present embodiment includes the medium attaching unit 40 and/or the circuit substrate 43 as the mounting unit to which two memory media each recorded with setting information regarding the communication path for the data communication can be mounted, the communicator 30 which performs data communication through the communication path according to setting information in one of the two memory media and the CPU 10 as the processor. When the following conditions are satisfied, the conditions which are the application program being executed is the specific application program registered in advance and the connection destination of the data communication started by the application program being executed is the specific connection destination registered in advance, the first selecting process which selects the first memory medium which stores the first setting information among the two memory media is executed. When the above conditions are not satisfied, the CPU 10 executes the second selecting process which selects the second memory medium which records the second setting information among the two memory media is executed.

According to the above, it is possible to suitably switch the setting of the communication path in the terminal apparatus 1 according to the application program being executed and the connection destination of the data communication while reducing the risks in network security.

The first setting information is the setting information for the communicator 30 to perform the data communication through the closed communication path R1 using the closed network N1. The second setting information is the setting information for the communicator 30 to perform the data communication through the general communication path R2 using the general network N2 which does not include the closed network N1.

According to the above, when the business application 23 is executed and the data communication needs to be performed through the closed communication path R1, the first SIM card 51 is automatically selected and the data communication can be performed with the closed communication path R1. Therefore, it is possible to suppress problems such as the business application 23 not being able to connect to the closed network N1 and communication error occurring.

When the general application 24 other than the business application 23 is executed, the second SIM card 52 is automatically selected. Therefore, it is possible to set so that the general application 24 does not connect to the closed network N1. In other words, the connection to the closed network N1 can be set strictly so that only the business application 23 connects to the closed network N1. Therefore, it is possible to prevent the general application 24 from making unauthorized access to the business server S1 through the closed network N1 for business. Therefore, risks in the network security can be decreased.

The first SIM card 51 is selected only when in addition to the condition that the application program being executed is the specific application program, the condition that the connection destination of the data communication is the specific connection destination allowed in advance is satisfied. Therefore, the network security can be more reliably secured. That is, the general application 24 which does not include the information of the specific connection destination can be reliably excluded from the closed network N1. Therefore, even if the general application 24 is listed in the business application list data 25 as the specific application program by mistake, it is possible to prevent the access to the closed network N1 by the general application 24.

The terminal apparatus 1 includes the storage 20 which stores the application program. The business application list data 25 showing the specific application program is stored in the storage 20. In the first selecting process and the second selecting process, based on the business application list data 25, the CPU 10 determines whether the application program being executed is the specific application program. According to the above, it is possible to determine whether the application program being executed is the specific application program (business application 23) reliably by a simple process referring to the business application list data 25.

The application program which is obtained by a specific method and which is stored in the storage 20 is included in the specific application program regarding modification 1. According to the above, the setting of the specific application program which can be connected to the closed network N1 can be added later on as necessary.

When the application program is obtained by the specific method and stored in the storage 20, the CPU 10 according to the modification 1 registers the application program as the specific application program in the business application list data 25 (registering process). According to the above, the setting of the specific application program can be added with a simple process such as updating the business application list data 25.

The above specific method includes the method to obtain the application program through the closed communication path R1 when the first memory medium is selected by the first selecting process. The application program obtained by such method is limited to the application program (according to the present embodiment, business application 23) which is safe and which does not become a problem to the network security even if data communication is performed through the closed communication path R1. The application programs obtained by such methods are to be the specific application program, and with this, the setting of the specific application program can be added while securing network security by a simple method which does not need authorization of connection to the closed network N1 in advance.

The above specific method includes the method so as to be able to obtain the application program to which the administrator of the terminal apparatus 1 provided authorization for obtaining the application program. The application program obtained by such method is limited to the application program (according to the present embodiment, business application 23) which is allowed in advance data communication through the closed communication path R1. Therefore, by setting such application program obtained by this method as the specific application program, the setting of the specific application program can be added while securing network security.

The specific application program is the application program which is allowed in advance data communication through the closed communication path R1. According to the above, it is possible to reliably secure network security.

The storage 20 stores the connection destination list data 26 which shows one or two or more specific connection destinations. In the first selecting process and the second selecting process, based on connection destination list data 26, the CPU 10 determines whether the connection destination of the data communication which is started according to the application program being executed is one or two or more specific connection destinations. According to the above, it is possible to determine whether the connection destination of the data communication is the specific connection destination reliably according to a simple process such as referring to the connection destination list data 26.

The above specific method includes the method to obtain the application program from the specific storage medium. With this, it is possible to obtain the application program with a simple method.

Two SIM cards as the two memory media can be mounted in the medium attaching unit 40 as the mounting unit. With this, the two SIM cards in which the predetermined setting information is stored can be switched and used in the terminal apparatus 1.

According to the modification 2, the mounting unit includes a medium mounting unit 40 as the first mounting unit and the circuit substrate 43 as the second mounting unit. At least one SIM card as the memory medium can be mounted in the medium attaching unit 40 and at least one eSIM as the memory medium can be mounted in the circuit substrate 43. With this, the setting of the communication path in the terminal apparatus 1 can be switched based on the setting information stored in the SIM card and the eSIM.

The circuit substrate 43 in which two eSIMs can be mounted is used to switch the setting of the communication path in the terminal apparatus 1 based on the setting information stored in the eSIMs.

The second mounting unit is the circuit substrate 43 included in the terminal apparatus 1, and the eSIM is an electronic element which is attached to the circuit substrate in a state which is not detachable from the terminal apparatus 1. With this, it is possible to omit the burden of attaching the SIM card. Moreover, it is possible to prevent unintended switching of the eSIM.

The communication method according to the present embodiment is a communication method for the terminal apparatus 1 including a mounting unit in which two memory media each storing setting information regarding the communication path of the data communication can be mounted, and a communicator 30 which performs data communication through the communication path according to the setting information of one of the two memory media. The communication method includes the first selecting step and the second selecting step. In the first selecting step, when the following conditions are satisfied, the conditions which are the application program being executed is the specific application program registered in advance and the connection destination of the data communication started by the application program being executed is the specific connection destination registered in advance, the first memory medium in which the first setting information is recorded is selected from the two memory media. In the second selecting step, if the above conditions are not satisfied, the second memory media in which the second setting information is recorded is selected from the two memory media.

According to the above method, the setting of the communication path in the terminal apparatus 1 can be suitably switched while reducing the risk on the network security.

The storage 20 as the non-transitory computer-readable storage medium according to the present embodiment stores the program 2 which can be executed by the CPU 10 of the terminal apparatus 1 including a mounting unit in which two memory media each storing setting information regarding the communication path of the data communication are mounted and a communicator 30 which performs data communication through the communication path according to the setting information of one of the two memory media. The program 2 allows the CPU 10 to execute the first selecting process when the following conditions are satisfied, the conditions which are the application program being executed is the specific application program registered in advance and the connection destination of the data communication started by the application program being executed is the specific connection destination registered in advance. In the first selecting process, the first memory medium which stores the first setting information is selected from the two memory media. When the above conditions are not satisfied, the program 2 allows the CPU 10 to execute the second selecting process in which the second memory medium which stores the second setting information is selected from the two memory media.

According to the above, it is possible to suitably switch the setting of the communication path in the terminal apparatus 1 according to the application program being executed and the connection destination of the data communication while reducing the risk on the network security.

According to the above description, the example uses the HDD or the SSD in the storage 20 as the non-transitory computer-readable storage medium storing the program 2 according to the present invention but the present invention is not limited to the above. As other non-transitory computer-readable storage media, information storage media such as flash memory or a CD-ROM can be applied. As the medium to provide the data of the program regarding the present invention through the communication lines, a carrier wave can be applied to the present invention.

The description regarding the embodiments above are merely one example of the terminal apparatus communication method and storage medium regarding the present invention and the present invention is not limited to the above.

For example, at least one of the business application list data 25 and the connection destination list data 26 can be stored in the ROM 12. In this case, the ROM 12 corresponds to the "storage" of the present invention.

At least some among the OS 21, communication monitoring control program 22, the business application 23, and the general application 24 can be stored in the ROM 12.

According to the above examples, the RAM 11 and the ROM 12 are included in the CPU 10, but the present invention is not limited to the above, and at least one of the RAM 11 and the ROM 12 can be provided separately from the CPU 10.

According to the above-described embodiments, the communicator 30 includes a first modem 31 and a second modem 32, and the data communication is performed by switching between the first modem 31 and the second modem 32 but the present invention is not limited to the above. For example, the modem included in the communicator 30 can be one and a first slot 41 and a second slot 42 can be connected to this modem. In this case, the slot (thus the SIM card or eSIM) to which the modem accesses can be electrically switched according to the selection of the SIM card or the eSIM by the CPU 10.

According to the above embodiment, the business application list data 25 is referred to determine whether the application program being executed is the specific application program, but the method to determine the specific application program is not limited to the above. For example, the application program (business application 23) belonging to the specific application program can be installed in a predetermined first region in the storage 20, the application program (general application 24) not belonging to the specific application program can be installed in a second region of the storage 20 outside the first region, and it is possible to determine whether the application program is the specific application program according to the region in which the application program being executed is stored.

According to the present embodiment, the example shows the specific application program which has authorization to connect to the closed network N1 being the business application 23 for business. The program is not limited to the above, and an application program for any purpose can be set as the specific application program.

The terminal apparatus 1 is not limited to an apparatus which performs data communication by wireless communication, and the data communication can be performed by connecting to a wired closed network N1 or a wired general network N2.

The setting information which enables audio call by the terminal apparatus 1 can be stored in the SIM card and the eSIM.

The memory medium is not limited to the SIM card or eSIM and any medium which records the setting information regarding the communication path for data communication can be used.

The detailed configuration and the detailed operation of each component in the terminal apparatus 1 according to the present embodiment can be changed without leaving the scope of the present invention.

Although various examples have been shown and described, the scope of the present invention is not limited by the embodiments described above, and the scope of the invention includes the scope of the attached claims and its equivalents.

What is claimed is:

1. A terminal apparatus comprising:
    a mounting unit to which two memory media each storing setting information regarding a communication path of data communication are mounted;
    a communicator which performs data communication through a communication path according to the setting information of either one of the two memory media;
    a storage capable of storing a plurality of application programs; and
    a processor,
    wherein the processor is configured to perform the following processes,
    a first selecting process which selects from the two memory media a first memory medium in which first setting information is stored when the following conditions are satisfied, wherein the conditions are that an application program being executed is a specific application program registered in advance among the plurality of application programs stored in the storage and that a connection destination of data communication started by the application program being executed is a specific connection destination registered in advance,
    a second selecting process which selects from the two memory media a second memory medium in which second setting information is stored when the above conditions are not satisfied, and
    a storage controlling process which controls storing in the storage,
    wherein the first setting information is setting information for the communicator to perform data communication through a closed communication path using a closed network,
    wherein the second setting information is setting information for the communicator to perform data communication through a general communication path using a general network not including the closed network, and
    wherein in the storage controlling process, when a new application program is stored in the storage, the new application program obtained by data communication through the closed communication path based on reference to the first setting information is permitted to be stored in the storage as the specific application program whereas the new application program obtained by data communication through the general communication path based on reference to the second setting information is prohibited to be stored in the storage as the specific application program.

2. The terminal apparatus according to claim 1,
    wherein, the storage stores first list data showing the specific application program, and
    in the first selecting process and the second selecting process, the processor determines whether the application program being executed is the specific application program based on the first list data.

3. The terminal apparatus according to claim 2, wherein the specific application program includes an application program which is obtained by a specific method and which is stored in the storage.

4. The terminal apparatus according to claim 3, wherein the specific method includes a method to obtain the application program through the closed communication network when the first memory medium is selected by the first selecting process.

5. The terminal apparatus according to claim 3, wherein the specific method includes a method to be able to obtain the application program when the administrator of the terminal apparatus allows the obtaining of the application program.

6. The terminal apparatus according to claim 3, wherein the specific method includes a method to obtain the application program from a specific storage medium.

7. The terminal apparatus according to claim 2, wherein the processor is configured to further perform a registering process in which the application program is registered in the first list data as the specific application program when the application program is obtained by a specific method and stored in the storage.

8. The terminal apparatus according to claim 2, wherein, the storage stores second list data which shows the specific connection destination, and the processor in the first selecting process and the second selecting process determines whether a connection destination of data communication started according to the application program being executed is the specific connection destination based on the second list data.

9. The terminal apparatus according to claim 1, wherein the specific application program is an application program in which data communication through the closed communication path is allowed in advance.

10. The terminal apparatus according to claim 1, wherein two SIM cards can be mounted in the mounting unit as the two memory media.

11. The terminal apparatus according to claim 1, wherein, the mounting unit includes a first mounting unit and a second mounting unit, at least one SIM card as the memory medium can be mounted in the first mounting unit, and at least one eSIM can be mounted as the memory medium in the second mounting unit.

12. The terminal apparatus according to claim 11, wherein, the second mounting unit is a circuit substrate included in the terminal apparatus, and the eSIM is an electronic element which is attached to the circuit substrate and which cannot be detached from the terminal apparatus.

13. The terminal apparatus according to claim 1, wherein two eSIMs can be mounted as the two memory media in the mounting unit.

14. A communication method for a terminal apparatus, the terminal apparatus including, a mounting unit to which two memory media each storing setting information regarding a communication path of data communication are mounted, a communicator which performs data communication through a communication path according to the setting information of either one of the two memory media, and a storage capable of storing a plurality of application programs, the communication method comprising:

a first selecting step which selects from the two memory media a first memory medium in which first setting information is stored when the following conditions are satisfied, wherein the conditions are that an application program being executed is a specific application program registered in advance among the plurality of application programs stored in the storage and that a connection destination of data communication started by the application program being executed is a specific connection destination registered in advance;

a second selecting step which selects from the two memory media a second memory medium in which second setting information is stored when the above conditions are not satisfied; and a storage controlling step which controls storing in the storage, wherein the first setting information is setting information for the communicator to perform data communication through a closed communication path using a closed network, wherein the second setting information is setting information for the communicator to perform data communication through a general communication path using a general network not including the closed network, and wherein in the storage controlling step, when a new application program is stored in the storage, the new application program obtained by data communication through the closed communication path based on reference to the first setting information is permitted to be stored in the storage as the specific application program whereas the new application program obtained by data communication through the general communication path based on reference to the second setting information is prohibited to be stored in the storage as the specific application program.

15. A non-transitory computer-readable storage medium having a program stored thereon which can be executed by a processor of a terminal apparatus including, a mounting unit to which two memory media each storing setting information regarding a communication path of data communication are mounted, a communicator which performs data communication through a communication path according to the setting information of either one of the two memory media, and a storage capable of storing a plurality of application programs, the program controls the processor to perform the following processes:

a first selecting process which selects from the two memory media a first memory medium in which first setting information is stored when the following conditions are satisfied, wherein the conditions are that an application program being executed is a specific application program registered in advance among the plurality of application programs stored in the storage and that a connection destination of data communication started by the application program being executed is a specific connection destination registered in advance, a second selecting process which selects from the two memory media a second memory medium in which second setting information is stored when the above conditions are not satisfied, and a storage controlling process which controls storing in the storage, wherein the first setting information is setting information for the communicator to perform data communication through a closed communication path using a closed network, wherein the second setting information is setting information for the communicator to perform data communication through a general communication path using a general network not including the closed network, and wherein in the storage controlling process, when a new application program is stored in the storage, the new application program obtained by data communication through the closed communication path based on reference to the first setting information is permitted to be stored in the storage as the specific application program whereas the new application program obtained by data communication through the general communication path based on reference to the second setting information is prohibited to be stored in the storage as the specific application program.

\* \* \* \* \*